(No Model.)
G. L. & J. BRUNTON.
PLOW.
No. 265,749. Patented Oct. 10, 1882.
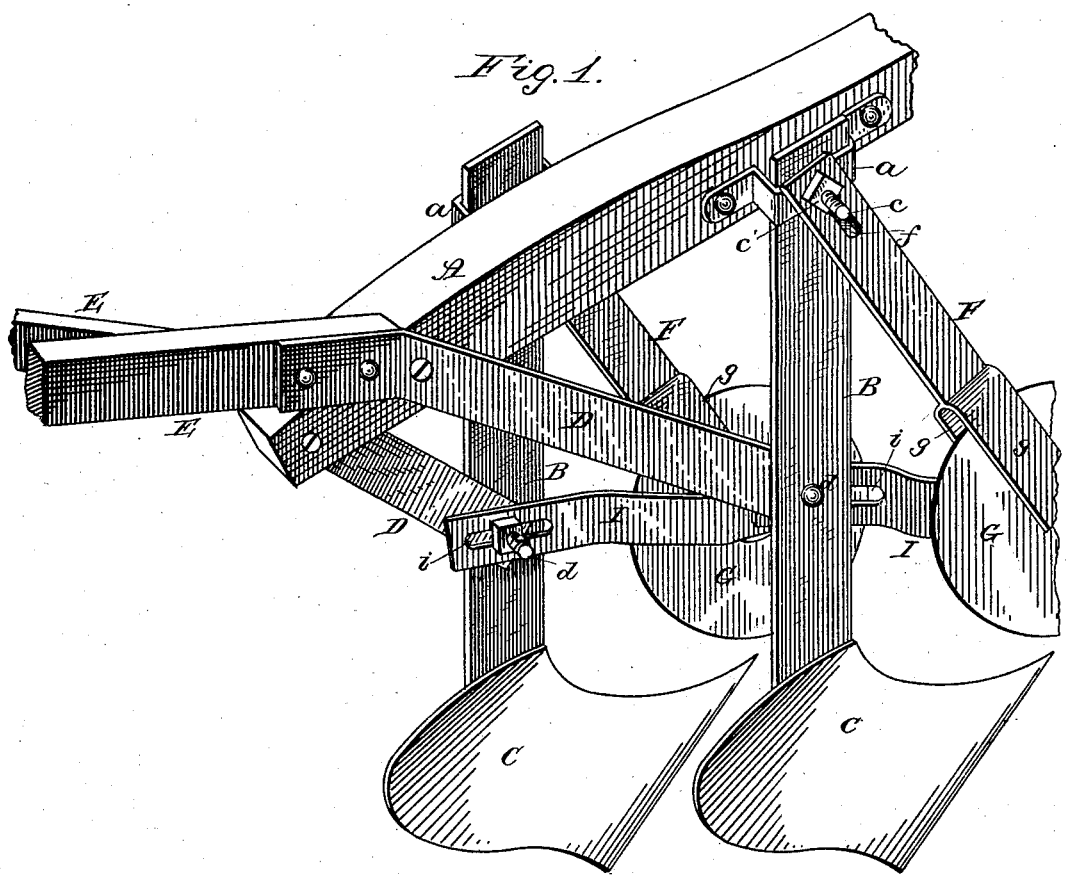
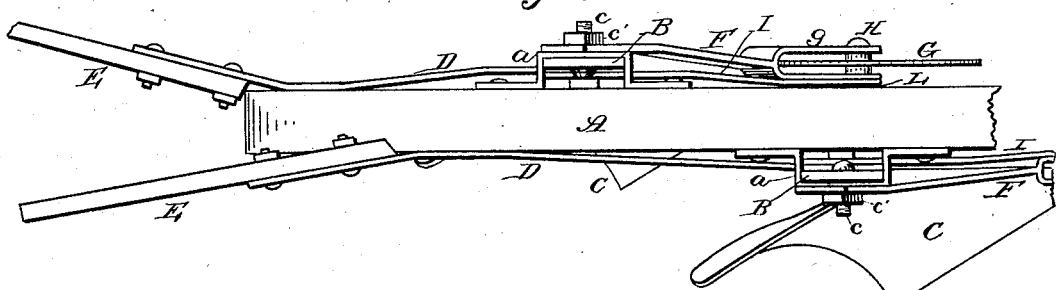

United States Patent Office.

GABRIEL L. BRUNTON AND JULIUS BRUNTON, OF CENTRALIA, ILLINOIS.

PLOW.

SPECIFICATION forming part of Letters Patent No. 265,749, dated October 10, 1882.

Application filed July 22, 1882. (No model.)

*To all whom it may concern:*

Be it known that we, GABRIEL L. BRUNTON and JULIUS BRUNTON, of Centralia, in the county of Marion and State of Illinois, have invented certain new and useful Improvements in Plows; and we do hereby declare the following to be a full, clear, and exact description of the invention, such as will enable others skilled in the art to which it pertains to make and use the same.

Our invention relates to plows adapted especially for use in the cultivation of strawberry or other vine plants which grow in rows.

The object of the invention is to provide a plow of this character which will be of simple and durable construction, and provided with a revolving colter or cutter adapted to cut the "runners" from the vines.

The invention consists in the improved construction and combinations of parts hereinafter described, and pointed out in the claim.

In the drawings, Figure 1 is a perspective view of a plow constructed in accordance with our invention, and Fig. 2 is a plan view of the same.

A represents the plow-beam, provided on opposite sides with brackets or loops $a\ a$, secured to the beam diagonally opposite each other.

B B represent plow-standards, having the plows C C secured thereto. The upper ends of the standards are removably secured within the brackets by screw-bolts $c$ and nuts $c'$, so that one plow will be in advance of the other.

D D represent diagonal braces, secured at their forward ends to the standards by screw-bolts $d\ d$ at about the center of the height of the standards, and by screws to the beam A, while the rear ends of said braces are rigidly secured to the plow-handles E E.

F F represent the yokes for supporting the colters G G. Each of said yokes is provided at its upper end with an elongated slot, $f$, through which projects the bolt $c$ of the standard on the outer side of the bracket $a$, where it is secured by the nut $c'$. The forward ends of the yokes F F are forked to form arms $g\ g$, between which are journaled the colters G G on bolts H. Upon the inner end of each of these bolts H is pivotally secured the forward end of a diagonal brace, I, which latter are each bent slightly, and provided at their rear ends with an elongated slot, $i$, through which pass the inner ends of the screw-bolts $d$. The forward ends of the braces I are held in place by nuts $h$. By means of the slotted braces I I and yokes F F the colters may be adjusted both vertically and horizontally, and their position relative to the plow nicely regulated.

It will be apparent that only a single colter, with its forked arm and slotted brace, may be employed, if preferred.

The plow constructed as above described is adjustable in all of its parts, and at the same time is simple and inexpensive in manufacture, durable in use, and adapted to operate effectively.

Having fully described our invention, what we claim as new, and desire to secure by Letters Patent, is—

In a vine-cutting cultivator, the combination, with the beam, of the plow-standards B, braced rearwardly to the beam, the colters G, arranged in front of the plows, the slotted yokes F, and the slotted braces I, pivotally secured to the axle of the colter and connected with the standard by the bolt which secures the handle-brace thereto, substantially as set forth.

In testimony whereof we have signed this specification in the presence of two subscribing witnesses.

GABRIEL L. BRUNTON.
JULIUS BRUNTON.

Witnesses:
JAMES R. CASKEY,
A. W. NELSON.